(12) United States Patent
Cho et al.

(10) Patent No.: US 7,310,761 B2
(45) Date of Patent: Dec. 18, 2007

(54) APPARATUS AND METHOD FOR RETRANSMITTING DATA PACKETS IN MOBILE AD HOC NETWORK ENVIRONMENT

(75) Inventors: Song-yean Cho, Seoul (KR); Jin-hyun Sin, Seoul (KR); Byung-in Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 10/831,274

(22) Filed: Apr. 26, 2004

(65) Prior Publication Data

US 2004/0213231 A1 Oct. 28, 2004

(30) Foreign Application Priority Data

Apr. 26, 2003 (KR) ............... 10-2003-0026615
Mar. 19, 2004 (KR) ............... 10-2004-0018890

(51) Int. Cl.
*G08C 25/02* (2006.01)
(52) U.S. Cl. .............. 714/748; 714/776; 714/807; 714/820; 370/390
(58) Field of Classification Search ............ 714/748, 714/776, 807, 820, 750, 752; 370/229, 230, 370/390
See application file for complete search history.

(56) References Cited

U.S. PATENT DOCUMENTS 5,440,545 A * 8/1995 Buchholz et al. ........... 370/426
6,170,075 B1 * 1/2001 Schuster et al. ............ 714/776
6,414,962 B1 * 7/2002 Hall et al. .................. 370/401
6,594,798 B1 * 7/2003 Chou et al. ................. 714/820
6,674,717 B1 * 1/2004 Duong-van et al. ........ 370/230
6,678,267 B1 * 1/2004 Anandakumar et al. .... 370/356
6,741,555 B1 * 5/2004 Li et al. ..................... 370/229
6,744,767 B1 * 6/2004 Chiu et al. ............. 370/395.21
6,947,381 B2 * 9/2005 Wen et al. .................. 370/231
6,968,498 B1 * 11/2005 Pal ............................ 714/807
6,973,023 B1 * 12/2005 Saleh et al. ................. 370/217

FOREIGN PATENT DOCUMENTS

| JP | 10-56479 A | 2/1998 |
|---|---|---|
| JP | 2000-252992 A | 9/2000 |
| JP | 2003-8588 A | 1/2003 |

* cited by examiner

*Primary Examiner*—Guy Lamarre
*Assistant Examiner*—Fritz Alphonse
(74) *Attorney, Agent, or Firm*—Sughrue Mion, Pllc.

(57) ABSTRACT

A method and an apparatus for requesting packet redelivery in a mobile ad hoc network environment. The method includes receiving a first packet periodically broadcasted, extracting packet delivery information of a second packet from the first packet, the second packet including data generated by an application program, determining loss of the second packet based on the packet delivery information, and broadcasting a request packet to request redelivery of the second packet, when it is determined that the second packet is lost.

20 Claims, 15 Drawing Sheets

NEIGHBOR NODE INFORMATION TABLE
(NEIGHBOR TABLE)

| NODE | LINK STATE | LATEST RBS OF NEIGHBOR NODES | Try_flag | NACKs |
|---|---|---|---|---|
| 3 | sym | -------- | ------ | ------ |
| 5 | sym | -------- | ------ | ------ |
| 6 | sym | -------- | ------ | ------ |

APPARATUS AND METHOD FOR RETRANSMITTING DATA PACKETS IN MOBILE AD HOC NETWORK ENVIRONMENT

BACKGROUND OF THE INVENTION

This application claims priority of Korean Patent Application No. 10-2003-0026615 and 10-2004-0018890 filed on Apr. 26, 2003, and Mar. 19, 2004, respectively, in the Korean Intellectual Property Office, the disclosures of which are incorporated herein in their entireties by reference.

1. Field of the Invention

Apparatuses and methods consistent with the present invention relate to a mobile ad hoc network, and more particularly, to an apparatus and method for retransmitting data packets so as to reduce the loss of packets caused in the course of transmission based on a broadcasting method (hereinafter referred to as "broadcast packet").

2. Description of the Related Art

Mobile ad hoc network refers to a network interconnecting mobile terminals (hereinafter referred to as "nodes") by use of wireless links, not based on any infrastructure.

Specifically, the mobile ad hoc network is a multihop wireless network without an infrastructure. In the mobile ad hoc network, every link is wireless and every node is mobile. So the mobile ad hoc network can be deployed easily and configured automatically.

However, the nodes constituting the mobile ad hoc network individually and independently move, and for this reason, a decentralization scheme in lieu of a centralization scheme should be employed to control the mobile ad hoc network or to share information among the nodes.

Thus, to control all the nodes constituting a mobile ad hoc network by the use of the decentralization scheme, a mechanism to transmit packets containing control information relative to all the nodes by a broadcasting mechanism is indispensable.

At this time, since the mobile ad hoc network lacks a centralized control device such as an access point of a wireless LAN (local area network) based on the infrastructure therefor, it is highly likely for a packet to be broadcasted simultaneously from more than one node. At this time, if two nodes overlapping with each other in a transmission region, in view of the inherent characteristics of wireless link, send the broadcast packet at the same time, a packet collision between the broadcast packets may occur. Because of the packet collision generated by overlapped paths in broadcast packet transmission, there is a high likelihood that important control information transmitted simultaneously from plural nodes may disappear, thereby lowering the reliability of broadcast packet transmission.

To secure the reliability of the transmission, the mobile ad hoc network system employs a flooding broadcast mechanism.

In the flooding mechanism, a source node initially generating a packet broadcasts the generated packet to all the neighbor nodes, and each of the neighbor nodes, in turn, broadcasts the packet received by it, exactly one time. This process continues until all the reachable nodes in the mobile ad hoc network receive the packet.

FIG. 1 illustrates a flooding mechanism described above. Referring to this figure, the flooding mechanism is described in more detail.

When a sending node broadcasts packets to its neighbor nodes, each of the neighbor nodes broadcasts the broadcast packet received by it to its neighbor nodes. Thus, a node receives the same packet several times, thereby consuming a large portion of the bandwidth and deteriorating the broadcast efficiency.

As illustrated in FIG. 1, a node #3 broadcasts a packet to its neighbor nodes, functioning as a source node and then a node #1 and a node #4 receiving the packet broadcast it to their neighbor nodes within one(1)-hop. At this time, a node #2, a node #6 and a node #7 receive the packet from the node #1 and a node #5 and a node #6 receive the packet from the node #4. Subsequently, the node #2, the node #5, the node #6 and the node #7 broadcast the packets received by them again to their neighbor nodes. At this time, most of the transmission regions overlap, thereby causing a large amount of packet loss.

According to the flooding mechanism, a single node is forced to receive the same packet several times redundantly, and as a result, a single packet loss can be compensated with other redundant packets and the broadcast reliability is not seriously degraded.

By contrast, the flooding mechanism seriously degrades the broadcast efficiency because the redundant packets are forwarded several times with the consumption of bandwidth.

Accordingly, in order to improve the broadcast efficiency in the mobile ad hoc network, a number of research groups have proposed a minimization of the number of the redundant packets.

One of the proposed methods is not to broadcast a packet repeatedly until all the nodes receive the broadcast packet but to allow only a part of neighbor nodes to broadcast the received packet again.

In the mobile ad hoc network, since mobile nodes are connected one to another by a wireless link without an infrastructure therefor, the network topology changes in time due to the mobility of the nodes constituting the network. Thus, the nodes belonging to the mobile ad hoc network periodically exchange with one another hello packets containing their own addresses and information on the neighbor nodes identified, to know the states of the neighbor nodes and the topology of the whole network.

Based on the information on neighbor nodes collected by the hello packet, a broadcast packet sender may select some nodes among the neighbor nodes as relayer nodes. As a typical mechanism, there is an Ad Hoc broadcast protocol (AHBP). The AHBP refers to a protocol under which an arbitrary node having information on the neighbor nodes within 2-hops selects an arbitrary node among the nodes within an 1-hop as a relayer node, and only the selected relayer node can broadcast the packet transmitted by the arbitrary node, again.

FIG. 2 specifically illustrates an operation of the AHBP.

Referring to this figure, some nodes broadcast packets so as to effectively use bandwidth by reducing the number of redundant packets as much as possible.

For example, if a node #3 is a source node, a node #1 and a node #4 are selected as relayer nodes by the node #3 and a node #6 is selected as a relayer node by either the node #1 or the node #4, node #6 broadcasts the packet as a relayer node.

However, minimization of the redundant packets by this method degrades reliability due to single packet loss. In particular, the degradation is worsened when the relayer node loses the packet.

Further, nodes constituting the mobile ad hoc network freely move and are involved in the transmission and reception of data independently from other nodes in the wireless link environment and thus there is a high likelihood that several nodes transmitting a broadcast packet simultaneously as depicted in FIG. 3. If so, the reliability will be greatly lowered because of packet collision generated whenever the paths overlap.

In this connection, there is a need for a mechanism to secure the reliability and the broadcast efficiency by reducing any effect from packet collision generated due to overlapped paths when more than one node transmits a broadcast packet in the mobile ad hoc network environment, and transmitting the broadcast packet efficiently and securely.

SUMMARY OF THE INVENTION

To meet the need described above, the present invention is conceived. An aspect of the present invention is to provide a method of allowing a receiver receiving a broadcast packet to detect a packet loss and to request a source node or a relayer node, both of which have sent the packet, to retransmit the lost packet.

The present invention is not limited to the aspect described above and any other aspects not described herein can be clearly comprehended by those skilled in the art from the detailed description of the invention hereunder.

According to an exemplary embodiment of the present invention, there is provided a method for requesting packet redelivery in a mobile ad hoc network environment, comprising receiving a first packet periodically broadcasted, extracting packet delivery information of a second packet from the first packet, the second packet including data generated by an application program, determining loss of the second packet based on the packet delivery information, and broadcasting a request packet to request redelivery of the second packet, when it is determined that the second packet is lost.

The first packet may comprise information to route all the nodes belonging to the mobile ad hoc network. Loss of the second packet may be determined when the extracted packet delivery information is not identical to the packet delivery information of the second packet received most recently. The request packet may comprise the same packet structure as the first packet. The packet delivery information is included in an area to indicate packet information with the first packet. The request packet may be broadcasted by establishing packet loss determination information to indicate packet loss within the request packet and information on the packet lost. The information on the lost packet may comprise packet delivery information on the lost packet and identification information to identify a node which transmitted the lost packet.

According to another exemplary embodiment of the present invention, there is provided an apparatus for packet redelivery in a mobile ad hoc network environment, comprising a transmission/reception module transmitting and receiving a packet containing therein packet delivery information of a data packet including data generated by a predetermined application program, packet loss identification information to identify loss of the data packet and information on the lost data packet, a packet managing module receiving the wireless packet from the transmission/reception module, generating an event in response to the packet loss identification information, or generating a packet to be delivered in a broadcast mechanism and delivering the packet to the transmission/reception module, a storage module storing the packet delivery information and routing information on neighboring nodes, and a control module performing data delivery between the predetermined application program and the packet managing module or event handling in response to the event.

The packet may be broadcasted periodically. The event handling may determine whether to redeliver the lost data packet with the use of the packet delivery information, when the packet loss identification information identifies non-loss of the packet. The event handling may determine whether to redeliver the lost data packet with the use of the information on the lost data packet, when the packet loss identification information identifies loss of the packet. The information on the lost data packet may comprise packet delivery information on the lost data packet and identification information to identify a node which transmitted the lost data packet.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION OF THE INVENTION

Figure 1:
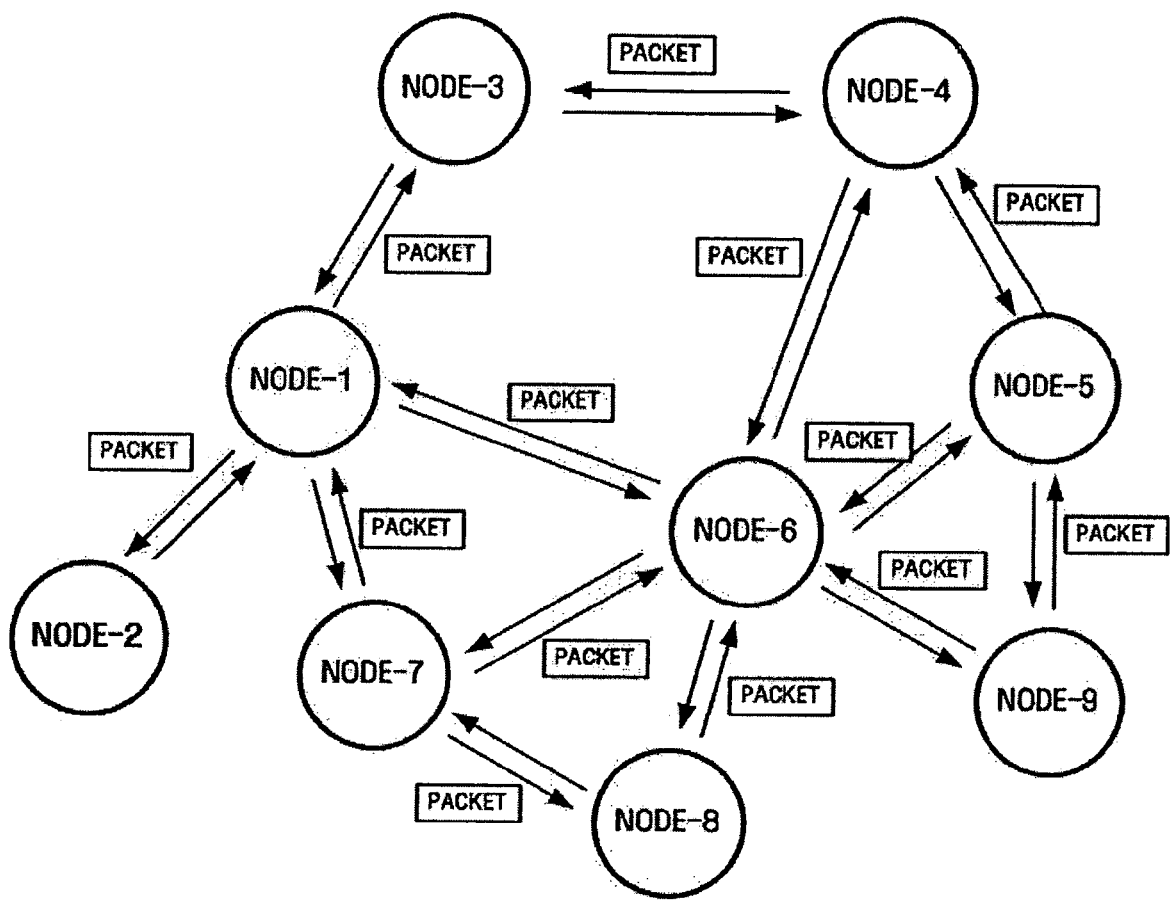
FIG. 1 is an exemplary view illustrating a flooding mechanism in a mobile ad hoc network according to a conventional art.
Figure 2:
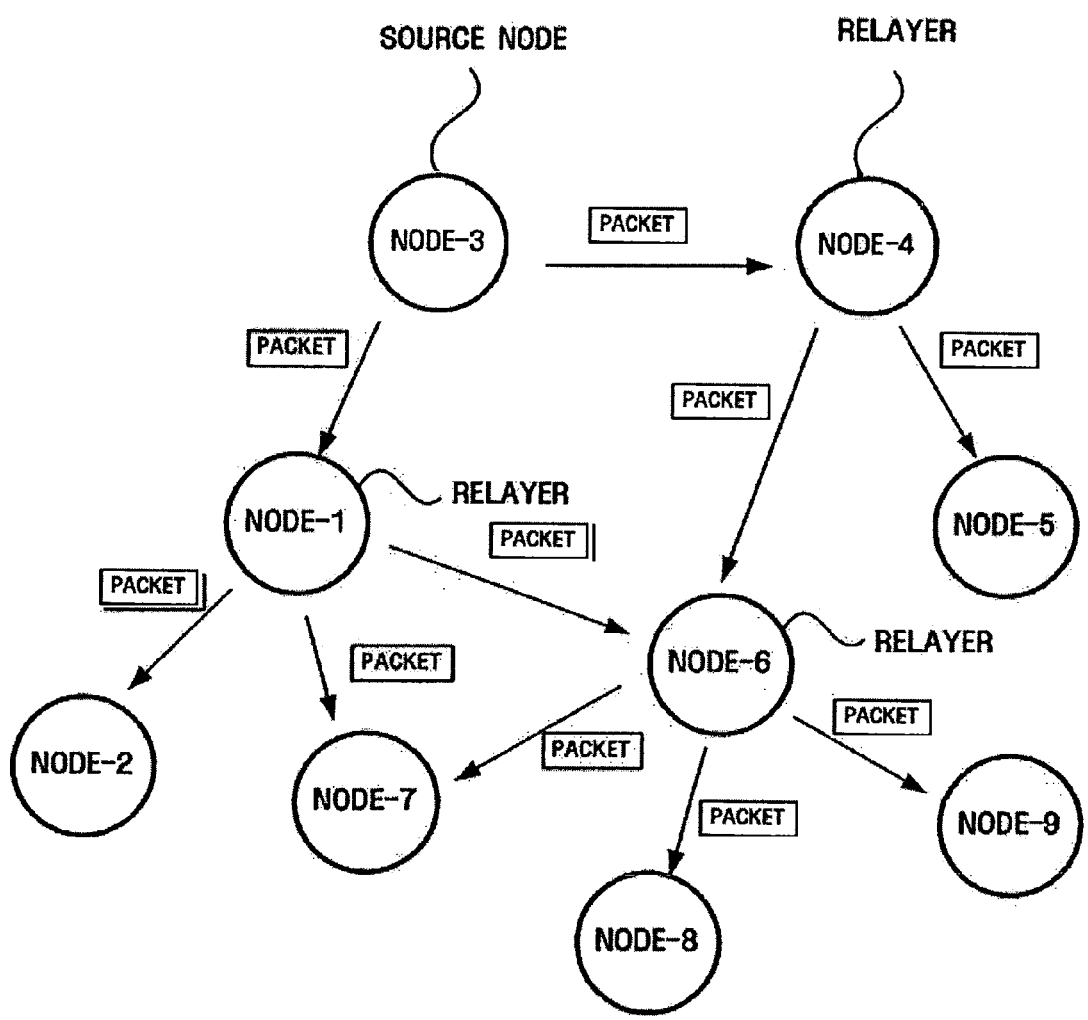
FIG. 2 is an exemplary view illustrating a conventional broadcast mechanism to obtain the efficiency of packet transmission in the mobile ad hoc network.
Figure 3:
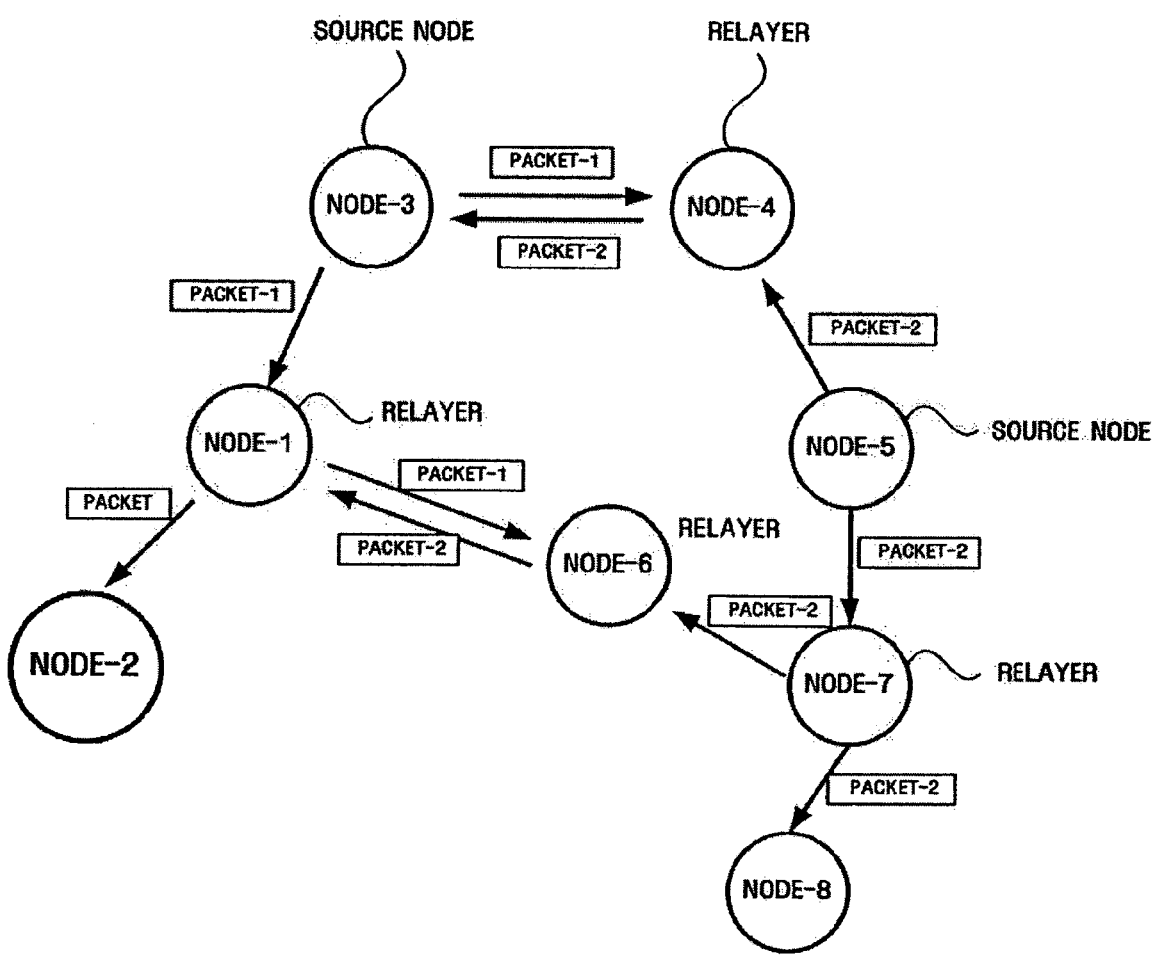
FIG. 3 is an exemplary view illustrating a mechanism in which packet collision occurs in FIG. 1.

The present invention is now described with reference to the accompanying drawings in which exemplary embodiments of the invention are shown. The present invention may, however, be embodied in many different forms and should not be construed as being limited to the exemplary embodiments set forth herein. Rather, these exemplary embodiments are provided so that this disclosure is thorough and complete, and conveys the scope of various example embodiments of the invention to those skilled in the art. The like reference numerals used in the the the specification designate the same elements.

Hereunder, exemplary embodiments of the present invention are described in detail with reference to the accompanying drawings.

For the sake of convenience in understanding the present invention, the following terms are used herein. "Source node" refers to a node to initially generate a packet and broadcast the packet, 'receiver' refers to a node to receive the packet, and 'relayer' refers to a node to broadcast again the received packet among the receivers.

For an exemplary embodiment of the present invention, RBS (relayer broadcast sequence number) is defined as information to detect loss of packet and to request redelivery of lost packet, wherein a value of the RBS can be set to a value of the predetermined field included in the broadcast packet.

The RBS value varies whenever a source node or a relayer transmits a broadcast packet. For understanding of the present invention, it is assumed that the RBS value increases by one (1) whenever a broadcast packet passes through a source node or a relayer.

Figure 4:
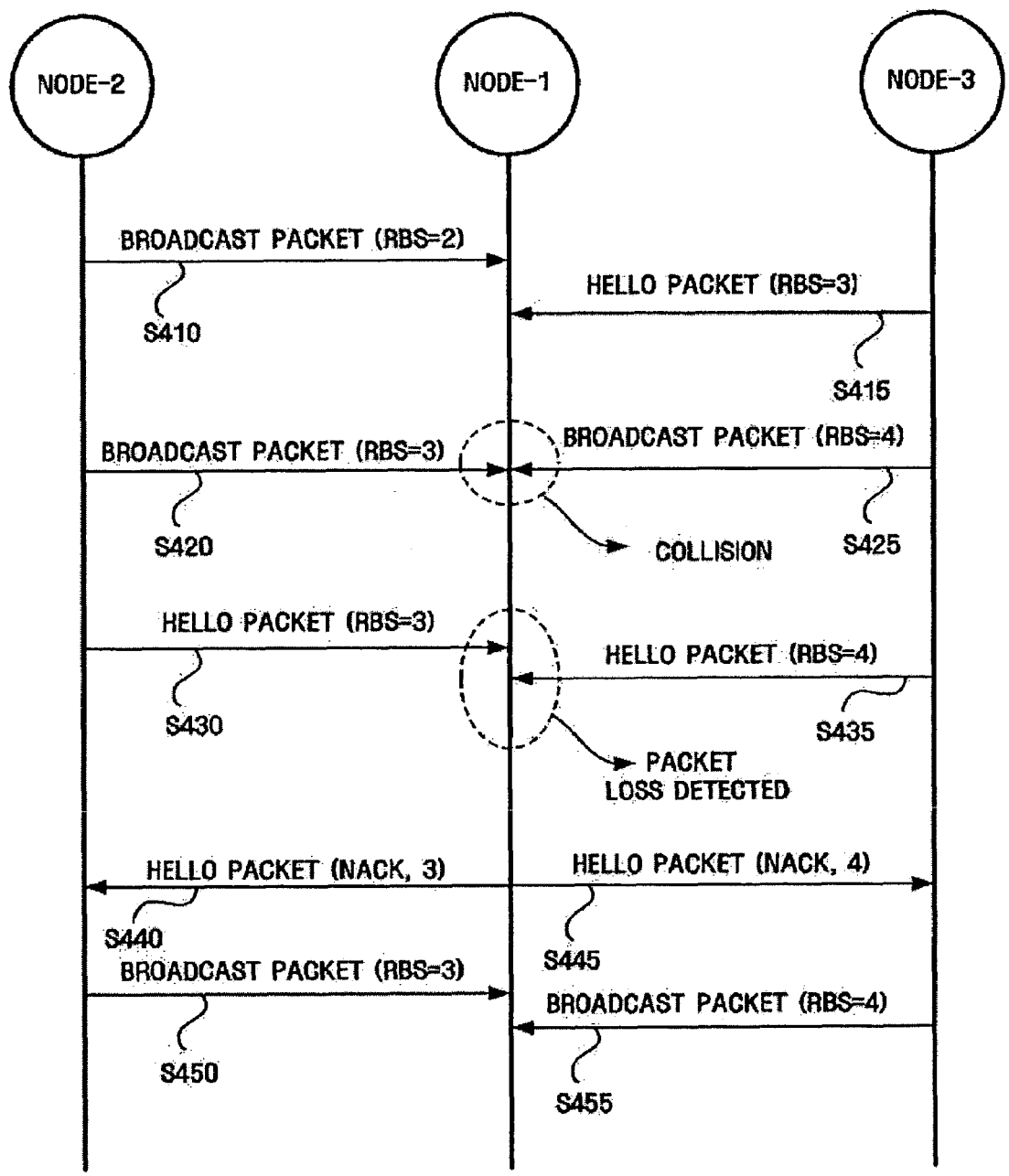
FIG. 4 is a schematic view illustrating a mechanism to detect packet loss and request redelivery of the lost packet according to an exemplary embodiment of the present invention.

FIG. 4 is a schematic view illustrating a mechanism to detect packet loss and request redelivery of the lost packet according to an exemplary embodiment of the present invention. The mechanism illustrated in this figure is described by way of example so as to clarify the subject matters claimed by the present invention, for which the present invention is not limited to the mechanism of FIG. 4.

In this figure, it is assumed that a node #1 is a receiver, a node #2 and a node #3 are relayers, and a process of detecting a packet loss and requesting redelivery of the lost packet according to transmission and reception of a broadcast packet and a hello packet is described. The hello packet is periodically exchanged among the respective nodes constituting a mobile ad hoc network, and the hello packet comprises routing information on itself and routing information on other nodes within 1-hop. The hello packet may be deemed as a kind of broadcast packet, but it is distinguished from the broadcast packet by defining the latter as a packet comprising application data and being transmitted by a broadcasting mechanism, in the description of the present invention.

After having received a broadcast packet whose RBS is set to 2 from the node #2 (S410), the node #1 receives a hello packet whose RBS is set to 3 within the predetermined period of time from the node #3 (S415). At this time, it is assumed that the node #1 has normally received a broadcast packet whose RBS is set to 3 from the node #3.

Then, the node #1 receives both the broadcast packet whose RBS is set to 3 from the node #2 and the broadcast packet whose RBS is set to 4 from the node #3 (S420 and S425). At this time, the packet is lost due to collision.

In the meantime, since the node #2 and the node #3 are not aware of the packet loss, they respectively broadcast a hello packet. Namely, since the node #2 has already transmitted the broadcast packet whose RBS is set to 3, it broadcasts a hello packet whose RBS is set to 3 (S430). Likewise, since the node #3 has already transmitted the broadcast packet whose RBS is set to 4, it broadcasts a hello packet whose RBS is set to 4 (S435). In this manner, an RBS value included in a hello packet indicates the RBS value of the latest broadcast packet transmitted by a relevant node. Meanwhile, the node #1 receives the hello packets by both the node #2 and the node #3 as it has not been aware of the packet loss.

After having received the broadcast packet whose RBS is set to 2 from the node #2, the node #1 receives a hello packet whose RBS is set to 3, and thus, it detects that a broadcast packet whose RBS is set to 3 has not been received. Likewise, after having received the broadcast packet whose RBS is set to 3 from the node #3, the node #1 receives a hello packet whose RBS is set to 4, and thus, it detects that the broadcast packet whose RBS is set to 4 has not been received. In this regard, the node #1 requests the node #2 and the node #3 to respectively retransmit a broadcast packet while broadcasting the hello packets (S440 and S445). At this time, to determine whether packet redelivery has been requested, a predetermined field within a hello packet is defined as an information field for requesting packet retransmission. Namely, the request of packet redelivery may be determined based on a value set in the information field. The field is referred to as 'NACK' herein. In a manner similar to what is depicted in FIG. 4, it is possible to request packet retransmission from more than two nodes. For an exemplary embodiment of the present invention, a predetermined field is established to comprise information on the packets within a hello packet, information on the nodes being requested to retransmit packets, and information on the packets subject to retransmission.

After having received hello packets from the node #1, the node #2 and the node #3 broadcast again the packets whose redelivery was requested by the node #1 (S450 and S455).

Figure 5:
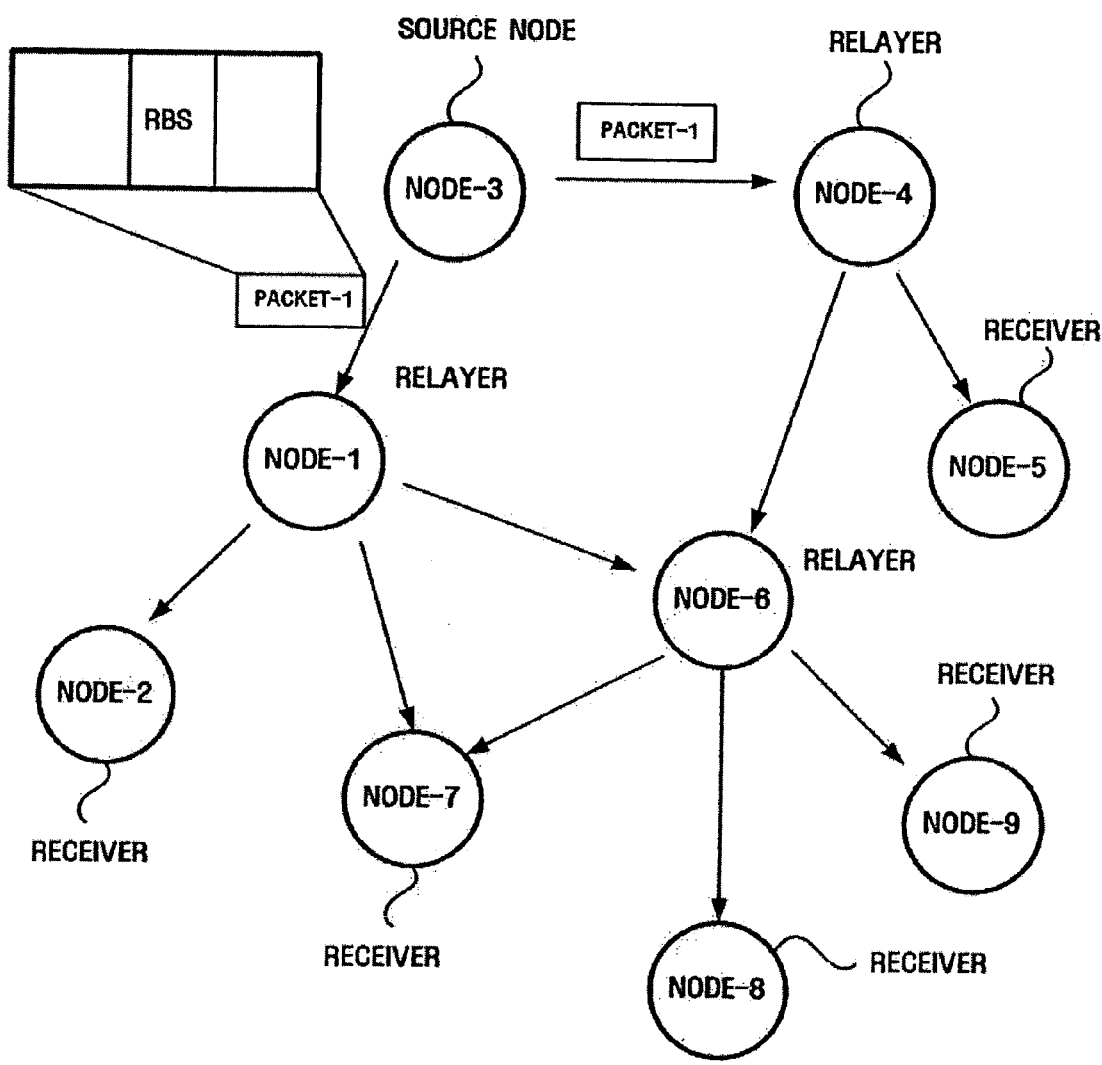
FIG. 5 is a view illustrating the topology of a mobile ad hoc network to a mechanism to request redelivery of data packet according to an exemplary embodiment of the present invention.

FIG. 5 is a view illustrating the topology of a mobile ad hoc network to a mechanism to request redelivery of data packet according to an exemplary embodiment of the present invention.

In this figure, it is assumed that a node #3 is a source node, a node #1, a node #4 and a node #6 are relayers and a node #2, a node #5, a node #7, a node #8 and a node #9 are receivers. At this time, an AHBP (Ad Hoc broadcast protocol) described above is applied in order to determine which node is selected as a relayer.

According to an exemplary embodiment of the present invention, when application data generated in the node #3 functioning as a source node are broadcast, information corresponding to RBS values should be established in a predetermined field within a broadcast packet as illustrated in FIG. 5. At this time, the broadcast packet may be a data packet based on a communication protocol enabling data communication between nodes. By way of example, an Internet protocol (IP) packet is described.

Figure 6:
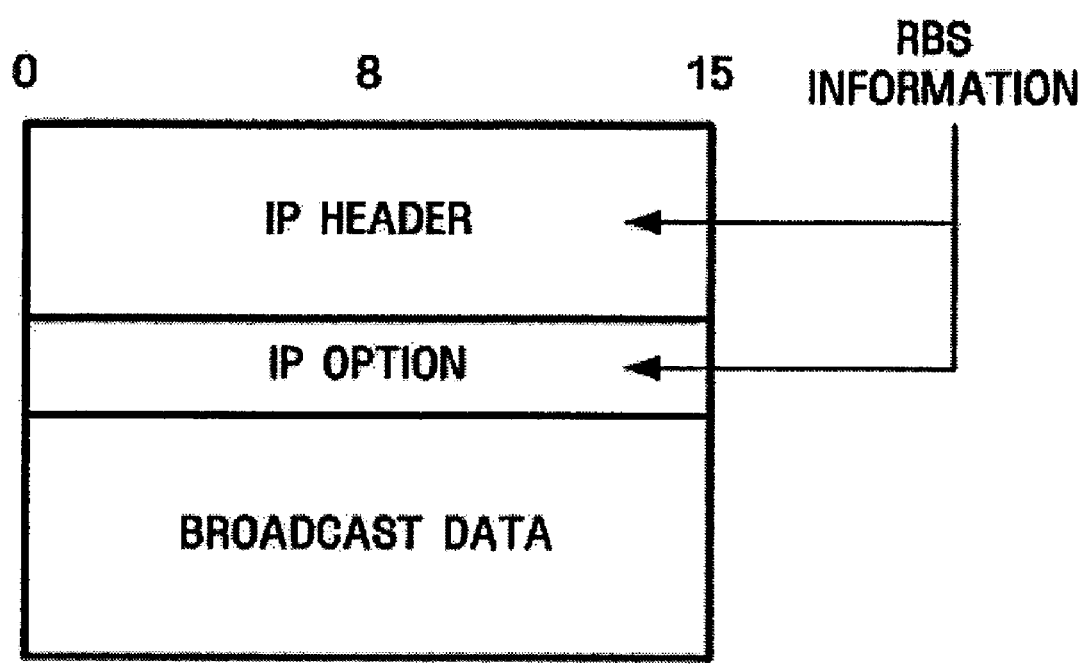
FIG. 6 is a view illustrating a format of a broadcast packet according to an exemplary embodiment of the present invention.

FIG. 6 is a view illustrating a format of a broadcast packet according to an exemplary embodiment of the present invention, wherein the structure of an IP packet is depicted as an example.

The IP packet comprises an IP header field containing information on packets and a data field corresponding to payload, and an IP option field is interposed between the IP header field and the data field. Information on RBS values according to an exemplary embodiment of the present invention may be established as being included in the IP header field or otherwise the IP option field. Hereinbelow, it is established that the IP header field comprises the IP option field.

Figure 7:
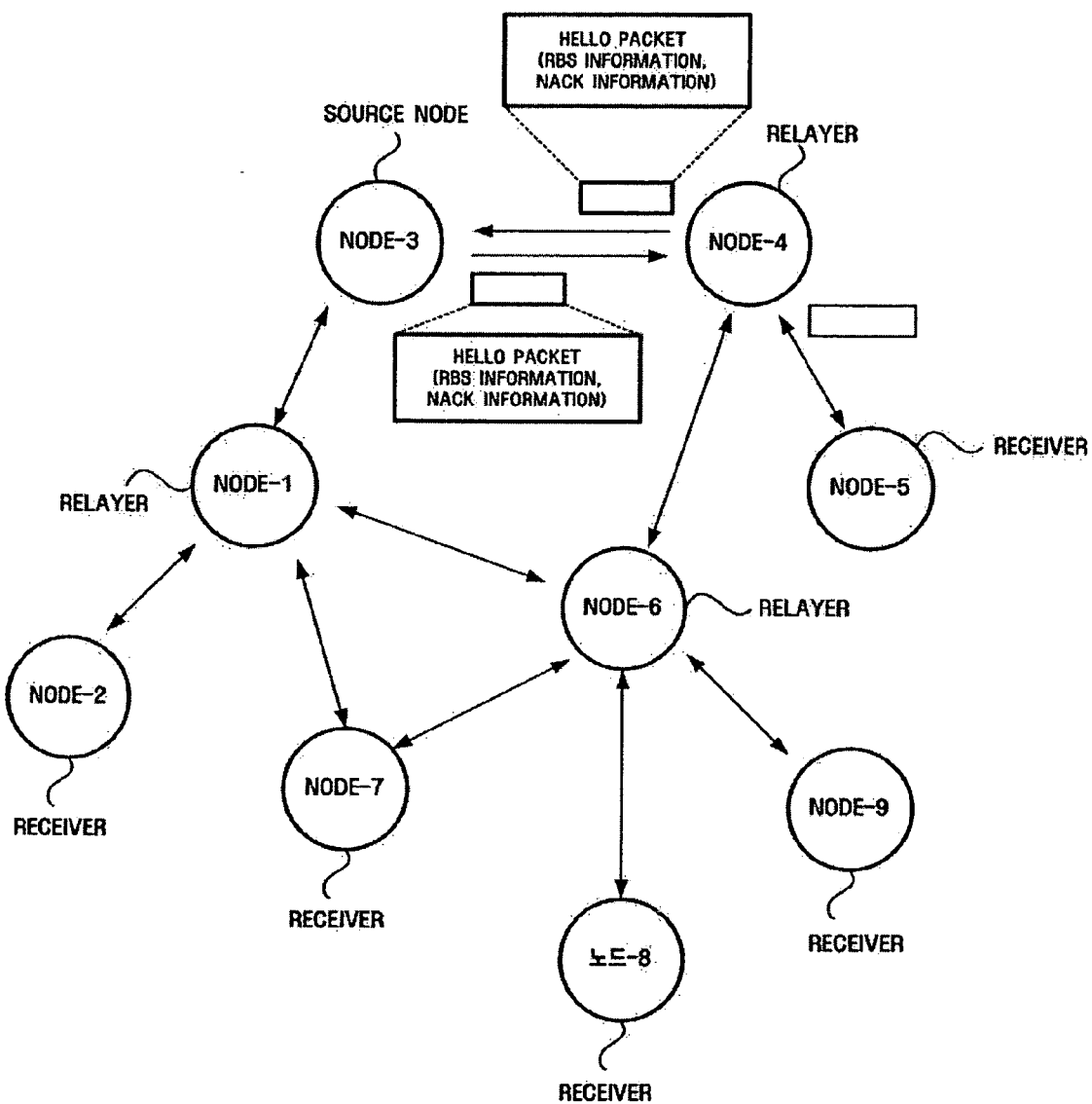
FIG. 7 is a view illustrating a mechanism to transmit and receive hello packets among the nodes constituting the network topology shown in FIG. 5 according to an exemplary embodiment of the present invention.

FIG. 7 is a view illustrating a mechanism to transmit and receive hello packets among the nodes constituting the network topology shown in FIG. 5 according to an exemplary embodiment of the present invention.

As described above, a hello packet is periodically broadcasted. After having transmitted a broadcast packet, a source node or a relayer broadcasts a hello packet to which the RBS value included in the transmitted packet is set. Additionally, when the relayer or a receiver detects packet loss, either of them sets an NACK information field in the hello packet and requests redelivery of packets by a broadcast mechanism. To perform the function as a hello packet as described above, the hello packet may be constructed as depicted in FIG. 8 which is a view illustrating a format of a hello packet according to an exemplary embodiment of the present invention.

Figures 8, 9:
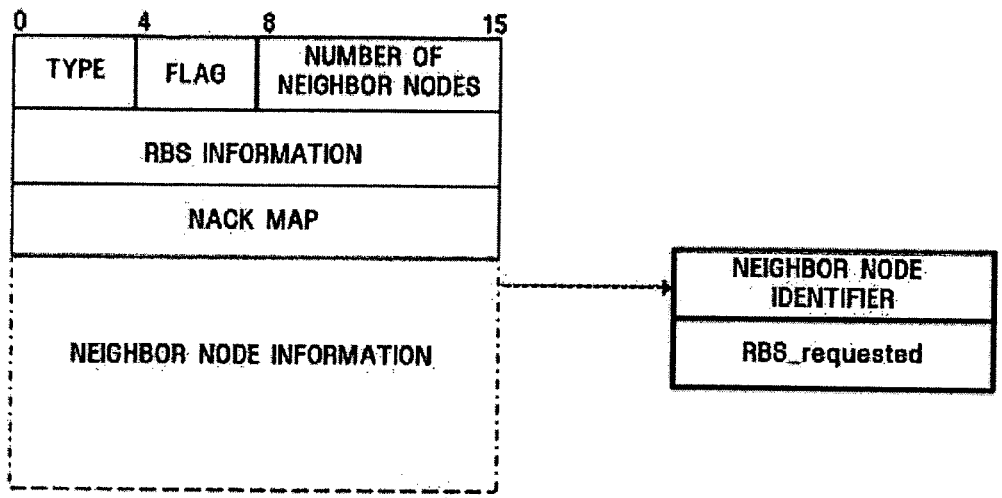
FIG. 8 is a view illustrating a format of a hello packet according to an exemplary embodiment of the present invention.
FIG. 9 is a view illustrating a table of neighbor node information according to an exemplary embodiment of the present invention.

The hello packet shown in FIG. 8 comprises a 'Type' field, a 'Flag' field, a 'Number of Neighbor Nodes' field, a 'RBS Information' field, a 'NACK map' field and a 'Neighbor Node Information' field.

The 'Type' field comprises information with which the type of hello packet is indicated.

The 'Flag' field comprises information to indicate that a node transmitting the hello packet lost a packet. For example, if a specific bit is set to be NACK field among the 'Flag' fields and the NACK field is set to 0, this indicates that the packet is not lost (hereinafter referred to as "NACK field is disabled"): if the NACK field is set to 1, this indicates that the packet is lost (hereinafter referred to as "NACK field is enabled"). In this manner, loss of a packet can be indicated.

The 'Number of Neighbor Nodes' field refers to the number of nodes within one-hop from the node transmitting the hello packet.

The 'RBS Information' field allows the node transmitting the hello packet to establish a RBS value of a broadcast packet received most recently from a source node or a relayer.

The 'Neighbor Node Information' field comprises a 'Neighbor Node Identifier' information indicating identification information of a node receiving packet redelivery and 'RBS_Requested' information indicating information on a packet requesting a node corresponding to the 'Neighbor Node Identifier' to retransmit the packet.

The 'NACK Map' field comprises pointer information on the 'Neighbor Node Identifier' or on "RBS_Requested." At this time, when information on two or more 'Neighbor Node Identifier' is located in the 'Neighbor Node Information' field, the 'NACK Map' field comprises information on two or more pointers to indicate the respective 'Neighbor Node Identifier' information.

The structure of a hello packet to implement the present invention is not limited to that illustrated in FIG. 8, but may be extended to other structures of the hello packet having similar functions.

FIG. 9 is a view illustrating a table of neighbor node information according to an exemplary embodiment of the present invention.

The neighbor node information table (Neighbor Table) stores therein RBS information contained in the broadcast or the hello packet received from neighbor nodes, and may be used when packet redelivery due to packet loss is requested. Thus, all the nodes belonging to the mobile ad hoc network update the Neighbor Table from time to time.

The 'node' field in the Neighbor Table comprises information on identifiers of the neighbor nodes. For easy description of the present invention, FIG. 9 refers to neighbor nodes as 'a node #3,' 'a node #5,' 'a node #6,' etc. The 'link state' field indicates a state of a wireless link applied to the present invention, wherein a wireless environment available for bi-directional communication between nodes is represented as 'sym.' The present invention is defined as being applicable only to the 'sym' state. Also, the 'latest RBS of neighbor nodes' field comprises information on an RBS value of the newest broadcast packet received, the 'Try_flag' field indicates the number of times of requesting a relevant node packet retransmission, and the 'NACKs' field comprises information on an RBS value of the packet lost. At this time, regarding the 'Try_flag' information, the number of times of requesting packet redelivery may be limited to the predetermined number of times. This is because too many request for packet redelivery may cause the network to be excessively overloaded.

The Neighbor Table for implementing the present invention is not limited to the structure illustrated in FIG. 9, but may comprise a table structure with fields having similar functions.

Figure 10:
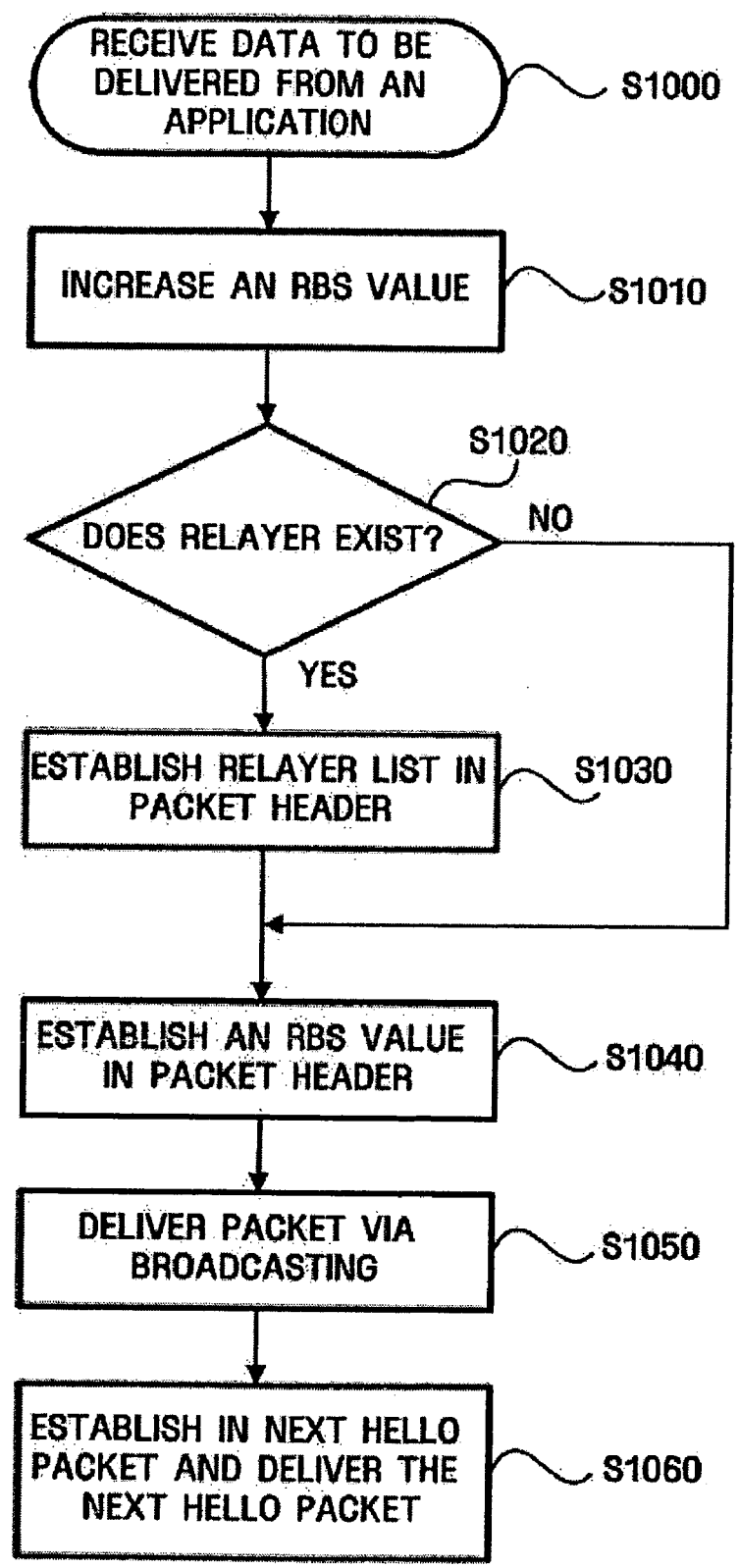
FIG. 10 is a flow chart illustrating a process of transmitting a broadcast packet according to an exemplary embodiment of the present invention.

FIG. 10 is a flow chart illustrating a process of transmitting a broadcast packet according to an exemplary embodiment of the present invention. More specifically, this figure illustrates a process of generating a packet from a source node and broadcasting the same.

When data to be broadcasted to a neighbor node is generated as an application program operates in the source node, a module responsible for data transmission and reception in the source node receives the data from the application program (S1000). At this time, the module may be realized by hardware or software, or in a combination of hardware and software.

Then, the source node increases its own RBS value by one (S1010) and examines whether there is a relayer among the neighbor nodes (S1020). At this time, the relayer may be selected by use of a relayer selection algorithm through the AHBP (Ad Hoc Broadcast Protocol). If the relayer is selected according to the algorithm, a list of the selected relayers is established in the header area of the broadcast packet as illustrated in FIG. 6 (S1030), and the source node establishes its own RBS value in the header area S1040. However, when the relayer is not selected according to the algorithm, the source node establishes its own RBS value in the header area of the packet to be broadcasted, not passing through step S1030.

When the RBS value is established in the header area of the broadcast packet, the source node broadcasts the packet (S1050), and establishes the RBS value included in the most recent broadcast packet in the hello packet periodically broadcasted, and broadcasts the hello packet (S1060).

Figure 11:
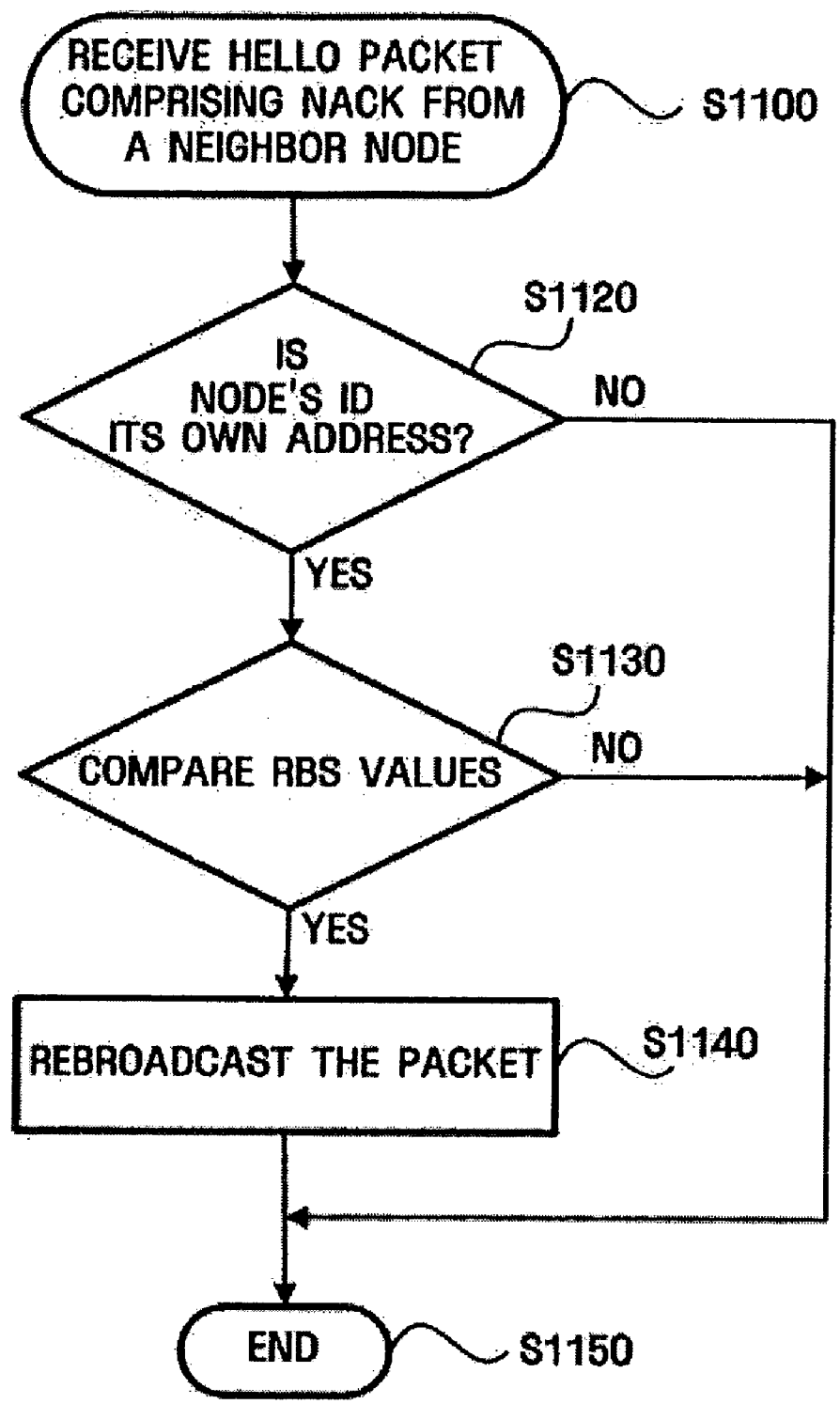
FIG. 11 is a flow chart illustrating a process of processing a hello packet received according to an exemplary embodiment of the present invention.

FIG. 11 is a flow chart illustrating a process of processing a hello packet received according to an exemplary embodiment of the present invention.

A source node or a relayer receives a hello packet including enabled NACK information from a neighbor node (S1100) and discards the received hello packet when a 'Neighbor Node Identifier' of the hello packet does not indicate itself.

However, when the 'Neighbor Node Identifier' of the hello packet indicates the source node or the relayer receiving the hello packet, the source node or the relayer having received the hello packet broadcasts again the broadcast packet corresponding to the RBS value if a 'RBS_requested' of the hello packet is identical to the RBS value of the most recent broadcast packet (S1130 and S1140).

Figure 12:
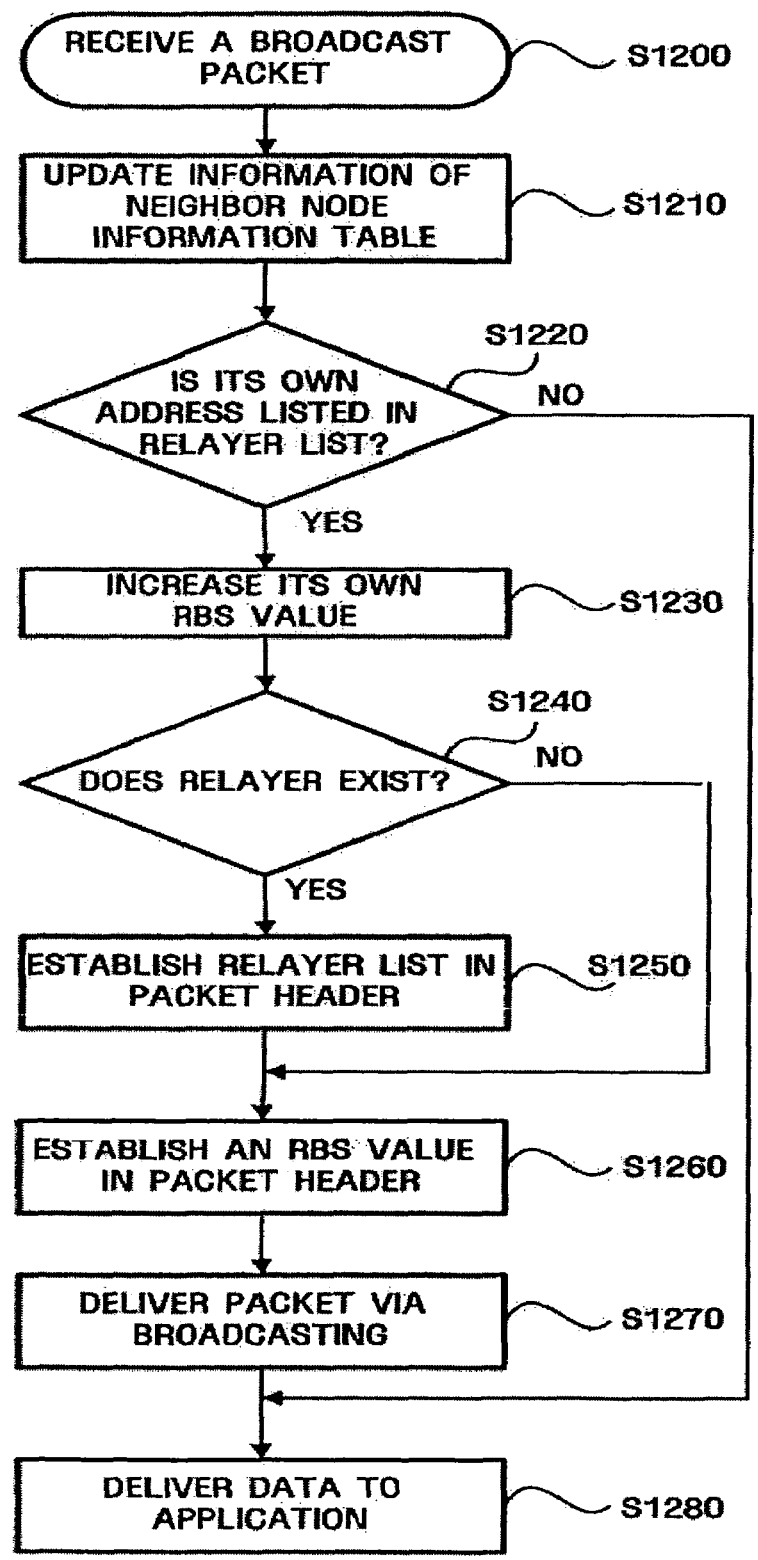
FIG. 12 is a flow chart illustrating a process of processing a broadcast packet received according to an exemplary embodiment of the present invention.

FIG. 12 is a flow chart illustrating a process of processing a broadcast packet received according to an exemplary embodiment of the present invention.

When an arbitrary node (hereinafter referred to as 'a receiving node' with respect to the description of FIG. 12) receives a broadcast packet (S1200), the receiving node updates information of the 'node' field and the 'latest RBS of neighbor nodes' field in the Neighbor Table as illustrated in FIG. 9.

Then, the receiving node examines whether its own address is listed in the relayer list contained in the received packet (S1220). When its own address does not exist therein, there is no need to broadcast the received broadcast packet again to the neighbor nodes, and thus, the receiving node transfers the data information contained in the received broadcast packet to its own application program (S1280).

When the relayer list included in the received packet contains its own address, the receiving node has to broadcast again the received broadcast packet to the neighbor nodes. Therefore, it passes through the steps illustrated in FIG. 10. Namely, the receiving node increases its own RBS value by one (S1230) and examines whether there is a relayer among the neighbor nodes (S1240). At this time, existence of the relayer may be selected by use of a relayer selection algorithm through the AHBP (Ad Hoc Broadcast Protocol). When the relayer is selected according to the algorithm, a list of the selected relayer is established in the header area of the broadcast packet as illustrated in FIG. 6 (S1250), and the receiving node establishes its own RBS value in the header area (S1260). However, when the relayer is not selected according to the algorithm, the receiving source node establishes its own RBS value in the header area of the packet to be broadcasted (S1260), not passing through step S1250.

When the RBS value is established in the header area of the broadcast packet, the receiving node broadcasts the packet (S1270), and transfers the data information included in the received broadcast packet to its own application program (S1280).

Additionally, the receiving node establishes the RBS value included in the most recent broadcast packet, in the hello packet to be periodically broadcasted.

Figure 13:
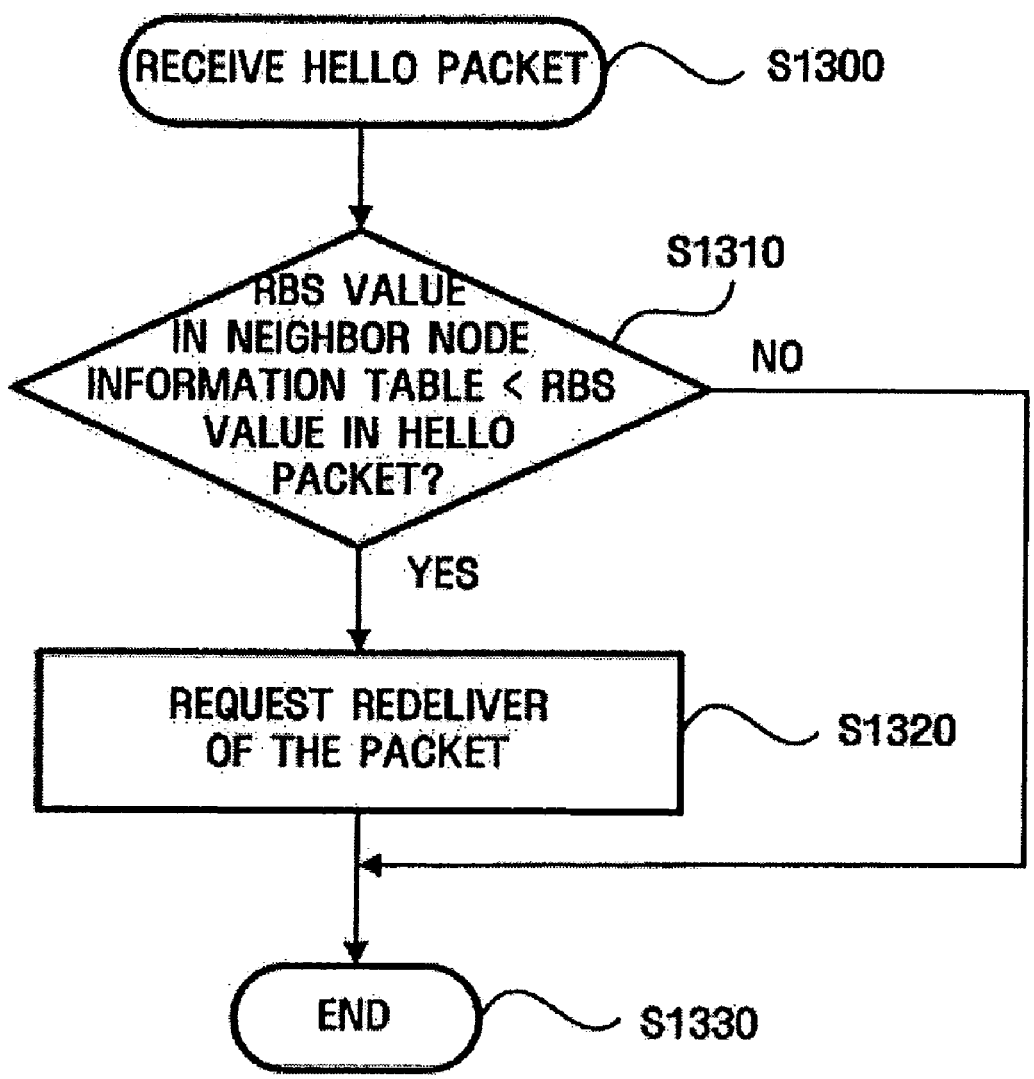
FIG. 13 is a flow chart illustrating a process of requesting redelivery of a packet according to an exemplary embodiment of the present invention.

FIG. 13 is a flow chart illustrating a process of requesting redelivery of a packet according to an exemplary embodiment of the present invention, wherein a receiver requests packet retransmission by way of example.

When the receiver receives a hello packet from a neighbor node (S1300), the receiver compares the RBS value in the received hello packet with a value of 'latest RBS of neighbor nodes' in the Neighbor Table managed by the receiver (S1310).

At this time, if the RBS value in the received hello packet is larger than the value of the 'latest RBS of neighbor nodes' field, the receiver is considered as having received no broadcast packet corresponding to the RBS value in the received hello packet. Thus, in this case the receiver determines that packet loss is generated and requests redelivery of the lost packet (S1320). The request is completed by enabling the NACK information in the 'Flag' field of the hello packet illustrated in FIG. 8, establishing information on the 'Neighbor Node Identifier' and 'RBS_requested' of the 'Neighbor Node Information' field, and thereafter, allowing the receiver to broadcast the hello packet.

Figure 14:
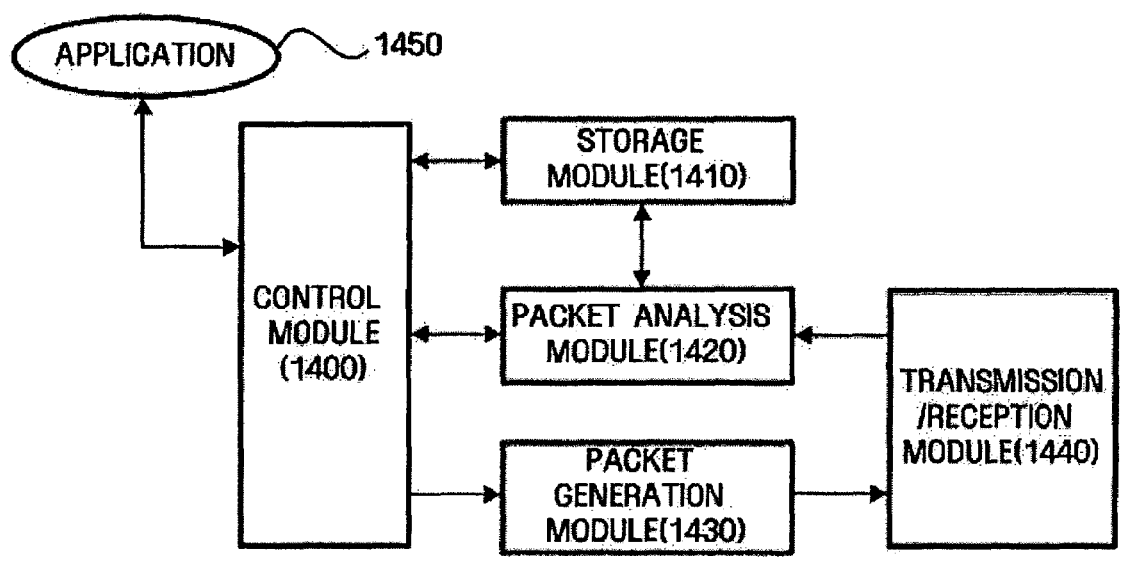
FIG. 14 is a block diagram illustrating an internal structure of an apparatus to request redelivery of a packet according to an exemplary embodiment of the present invention.

FIG. 14 is a block diagram illustrating an internal structure of an apparatus to request redelivery of a packet according to an exemplary embodiment of the present invention.

The apparatus illustrated in FIG. 14 comprises a transmission/reception module 1440 transmitting and receiving data through a wireless link, a storage module 1410 storing therein transmission/reception packet information to identify whether to retransmit a packet and other routing information, a packet analysis module 1420 receiving a packet transmitted from the transmission/reception module 1440 and extracting a kind of the packet and information included in the packet, a packet generation module 1430 generating a packet to be transmitted and transmitting the packet to the transmission/reception module 1440, and a control module 1400 controlling the operation of the storage module 1400, the packet analysis module 1420 and the packet generation module 1430 and transmitting and receiving data with an application program 1450. In an embodiment, the packet analysis module 1420 and the packet generation module 1430 may be operated as a single module. In this case, they are collectively referred to as a packet managing module.

At this time, the modules may be constructed with software or hardware comprising FPGA (Field Programmable Gate Array), or ASIC (Application Specific Integrated Circuit).

Hereinbelow, two cases are described: a case when a node on which the modules are mounted receives a packet and a case when the node transmits a packet.

When the node receives a packet through the transmission/reception module 1440, the packet analysis module 1420 examines whether the received packet is a hello packet or a broadcast packet. If the received packet is the hello packet, the control module 1400 broadcasts again the packet already broadcasted according to the method as illustrated in FIGS. 11 and 13 or requests another node to retransmit a packet. If the received packet is the broadcast packet, the control module 1400 broadcasts again the broadcast packet received according to the method as illustrated in FIG. 12 to neighbor nodes. At this time, the 'Neighbor Table' field illustrated in FIG. 9 may be stored in the storage module 1410. A process where the node transmits a packet through the transmission/reception module 1440 is illustrated in FIG. 10. At this time, when a broadcast packet is transmitted, the control module 1400 starts its operation after receiving application data transmitted from the application 1450. When a hello packet is transmitted, the control module 1400 allows the packet generation module 1430 to periodically generate and broadcast a hello packet by use of the information stored in the storage module 1410.

When the node receives a packet through the transmission/reception module 1440 and accesses a packet loss identification information included in the received packet, a message, a function, a return value, procedure or a child processor depending upon the packet loss identification information may be generated in terms of software, that is, depending upon the design of the software; at this time, they may be called 'events.' Any operations preset may be performed according to any of the generated events; at this time, they are called 'event handling.'

An exemplary algorithm of the present invention has been simulated by use of 'Network Simulator 2' widely used for simulation of a wireless or wired network, which is described hereinbelow. At this time, the algorithm employed in the present invention is referred to as an 'improved AHBP,' for the purpose of comparing the 'Flooding' algorithm and the 'AHBP' algorithm.

As parameters for the simulation, a packet transmission range is set to 250 m and a network type adopts IEEE (Institute of Electrical and Electronics Engineers) 802.11 (2 Mbps) Standards. As scenario parameters, a field size is set to 500*500(m), a simulation time to 100 seconds, a data packet size to 64 bytes payload, a mobility model to 'random waypoint,' and a packet delivery rate to 6.4 bps.

The Flooding algorithm is the highest reliable broadcast protocol and AHBP is the most efficient broadcast protocol.

In an exemplary simulation for the present invention, reliability is measured by use of a packet delivery rate (hereinafter referred to as "PDR") and broadcast efficiency is measured by use of bandwidth consumed by counting the number of packets retransmitted.

The simulation results show that a mechanism employed by the present invention improves AHBP's reliability to be similar to the reliability of the flooding mechanism, without increasing the bandwidth consumption.

The simulation has been tested with respect to two scenarios, one having a single source node and the other having multiple source nodes. In the single source node-based scenario, a broadcast packet is generated from a source node and then transmitted. In the multiple source nodes-based scenario, broadcast packets are generated simultaneously from one and more source nodes and then transmitted.

Simulation results with respect to (1) packet delivery rate and (2) bandwidth consumption is described in detail.

(1) Packet Delivery Rate

Figure 15:
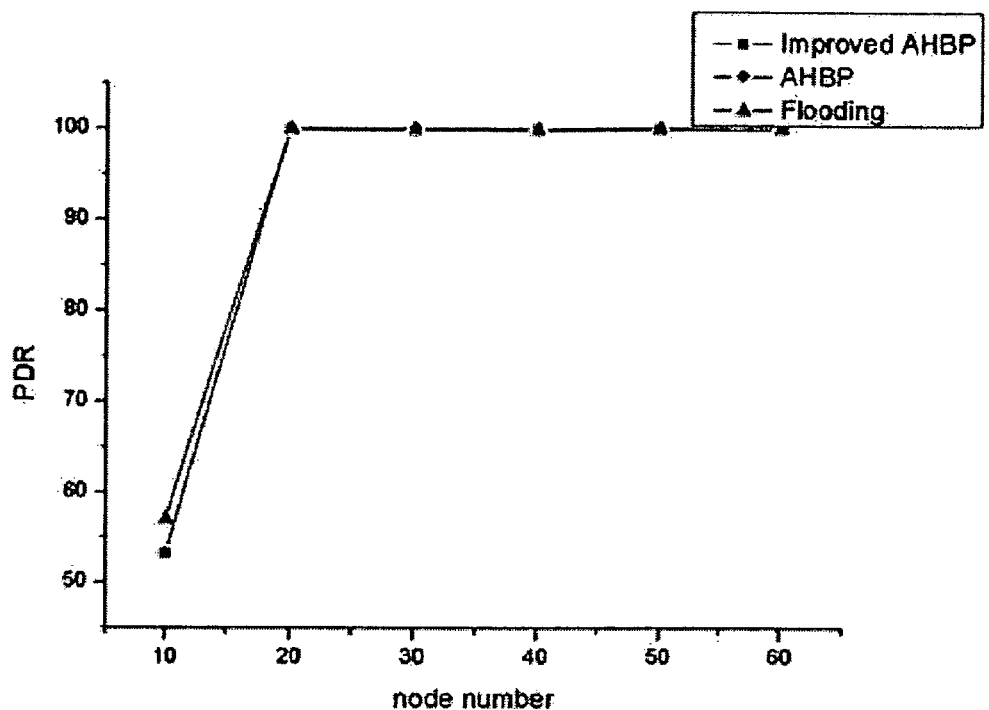
FIG. 15 is a graph illustrating the packet delivery rate measured relative to a single source node as a result of a simulation based on the present invention.
Figure 16:
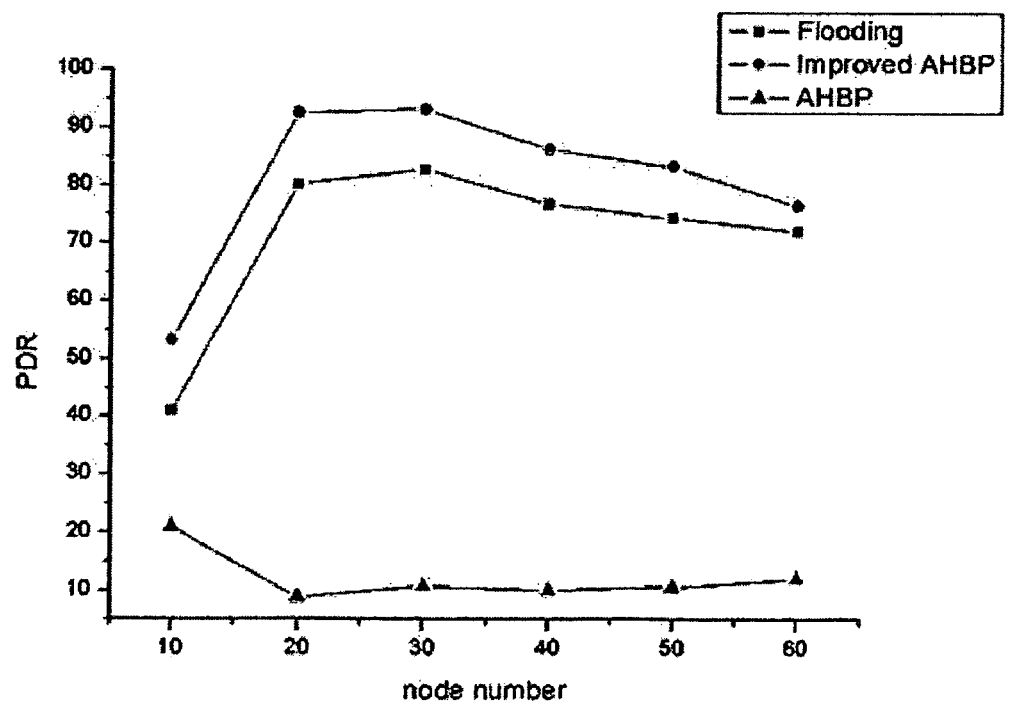
FIG. 16 is a graph illustrating the packet delivery rate measured relative to multiple source nodes as a result of a simulation based on the present invention.

FIG. 15 is a graph illustrating the packet delivery rate measured relative to a single source node as a result of a simulation and FIG. 16 is a graph illustrating the packet delivery rate measured relative to multiple source nodes as a result of a simulation.

As illustrated in FIG. 15, flooding, AHBP and improved AHBP algorithms in the single source node-based scenario are very similar in performance. However, in the multiple source nodes-based scenario, PDR is dramatically degraded to less than 20% in the AHBP algorithm, which results from non-inspection of packet loss at the relayer.

However, the improved AHBP algorithm and the flooding algorithm achieve very similar PDR, as illustrated in FIG. 16.

(2) Bandwidth consumption

Figure 17:
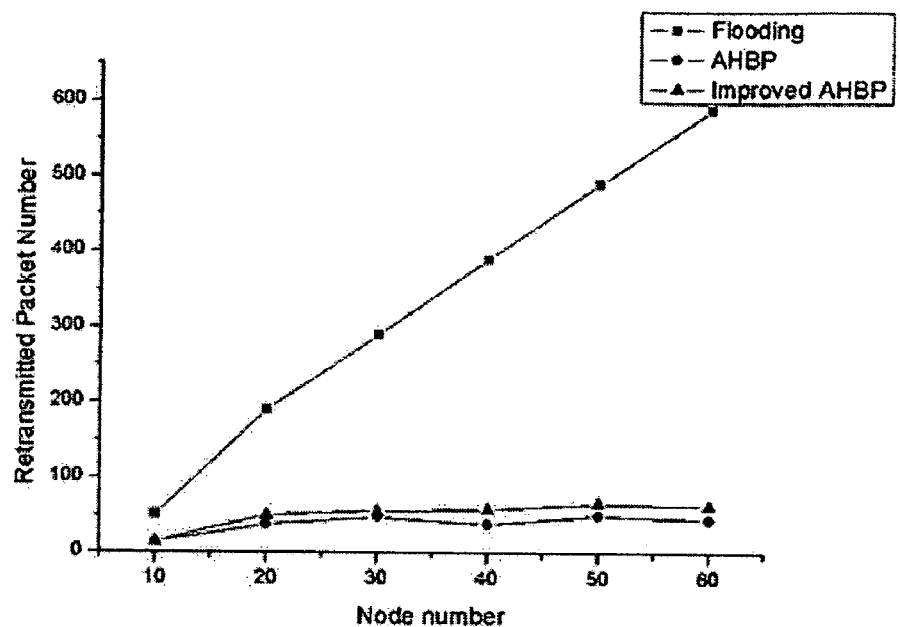
FIG. 17 is a graph illustrating the number of packets retransmitted relative to a single source node as a result of a simulation based on the present invention.
Figure 18:
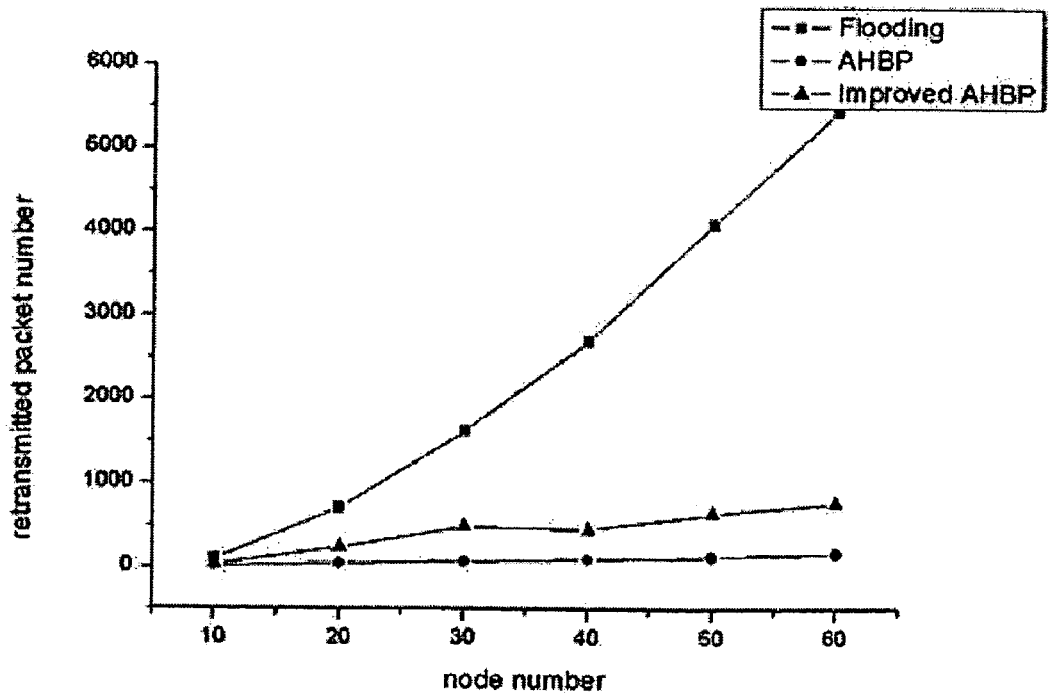
FIG. 18 is a graph illustrating the number of packets retransmitted relative to multiple source nodes as a result of a simulation based on the present invention.

FIG. 17 is a graph illustrating the number of packets retransmitted for a single source node as a result of a simulation and FIG. 18 is a graph illustrating the number of packets retransmitted for multiple source nodes as a result of a simulation.

As illustrated in FIG. 17, the flooding algorithm shows that the number of packets retransmitted linearly increases in the single source node-based scenario but exponentially increases in the multiple source nodes-based scenario as illustrated in FIG. 18.

However, the AHBP algorithm shows that the retransmitted packet number remains approximately under 100 in the single source node-based scenario as illustrated in FIG. 17 but it remains approximately under 400 in the multiple source node-based scenario as illustrated in FIG. 18.

Meanwhile, an improved AHBP algorithm would achieve similar results to the AHBP algorithm.

As shown in FIGS. 16 and 18, the improved AHBP algorithm employed by the present invention achieves high reliability with low bandwith consumption especially in the multiple source nodes-based scenario.

As described above, the present invention may achieve high reliability and broadcast efficiency at the same time by minimizing effects from packet collision and delivering broadcast packets efficiently and securely when broadcast packets are transmitted and received in a mobile ad hoc network.

Although the present invention has been described in connection with the exemplary embodiments of the present invention illustrated in the accompanying drawings, it is not limited thereto since those skilled in the art can make various modifications and changes without departing from the scope and spirit of the invention.

What is claimed is:

1. A method for requesting packet redelivery in a mobile ad hoc network environment, comprising:
    receiving a first packet;
    extracting packet delivery information of a second packet from the first packet as extracted packet delivery information, the second packet including data generated by an application program;
    determining a loss of the second packet based on the packet delivery information; and
    broadcasting a request packet to request redelivery of the second packet, when the second packet is determined to be lost in the determining operation.

2. The method as claimed in claim 1, wherein the first packet comprises routing information of a plurality of nodes belonging to the mobile ad hoc network.

3. The method as claimed in claim 1, wherein the loss of the second packet is determined when the extracted packet delivery information is not identical to the packet delivery information of the second packet.

4. The method as claimed in claim 1, wherein the request packet comprises substantially the same packet structure as the first packet.

5. The method as claimed in claim 1, wherein the packet delivery information is included in an area to indicate packet information, of the first packet.

6. The method as claimed in claim 1, wherein the request packet is broadcasted by establishing packet loss determination information to indicate the loss of the second packet within the request packet and information on the second packet and the second packet is a lost packet.

7. The method as claimed in claim 6, wherein the information on the lost packet comprises the packet delivery information on the lost packet and identification information to identify a node which transmitted the lost packet.

8. The method as claimed in claim 1, wherein the determining the loss of the second packet comprises comparing a packet loss identification information in the packet delivery information extracted from the first packet and a packet loss identification information in a packet delivery information included in a last-received data packet.

9. The method as claimed in claim 8, wherein i) there is no loss of the second packet if the packet loss identification information of the last-received data packet is the same as a packet loss identification information of the second packet and ii) there is the loss of the second packet if the packet loss identification information of the last-received data packet is not the same as the packet loss identification information of the second packet.

10. The method as claimed in claim 9, wherein the packet loss identification information of the first packet and the second packet are relayer broadcast sequence numbers.

11. The method as claimed in claim 1, wherein the first packet is a HELLO packet.

12. An apparatus for packet redelivery in a mobile ad hoc network environment, comprising:
a transmission/reception module transmitting and receiving a first packet comprising packet delivery information of a data packet including data generated by a predetermined application program, packet loss identification information to identify a loss of the data packet and information on the lost data packet;
a packet managing module receiving the first packet from the transmission/reception module if the first packet is received by the transmission/reception module, generating one of an event in response to the packet loss identification information and a second packet to be delivered in a broadcast mechanism and to be delivered to the transmission/reception module;
a storage module storing the packet delivery information and routing information on neighboring nodes; and
a control module performing a transfer of data between the predetermined application program and the packet managing module or performing event handling in response to the event.

13. The apparatus as claimed in claim 12, wherein the packet is broadcasted periodically.

14. The apparatus as claimed in claim 12, wherein the event handling determines whether to redeliver the lost data packet with the use of the packet delivery information, when the packet loss identification information identifies a non-loss of the packet.

15. The apparatus as claimed in claim 12, wherein the event handling determines whether to redeliver the lost data packet with the use of the information on the lost data packet, when the packet loss identification information identifies the loss of the lost data packet.

16. The apparatus as claimed in claim 15, wherein the information on the lost data packet comprises packet delivery information on the lost data packet and identification information to identify a node which transmitted the lost data packet.

17. The apparatus as claimed in claim 12, wherein the transmission/reception module receives the first packet and the loss of the data packet is identified by the control module which compares the packet loss identification information in the first packet and a packet loss identification information included in a last-received packet.

18. The apparatus as claimed in claim 17, wherein i) there is no loss of the data packet if the packet loss identification information of the last-received packet is the same as a packet loss identification information of the data packet and ii) there is the loss of the data packet if the packet loss identification information of the last-received packet is not the same as the packet loss identification information of the data packet.

19. The apparatus as claimed in claim 18, wherein the packet loss identification information of the first packet and the data packet are relayer broadcast sequence numbers.

20. The apparatus as claimed in claim 12, wherein the first packet is a HELLO packet.

* * * * *